(12) United States Patent
Wang et al.

(10) Patent No.: US 9,563,076 B2
(45) Date of Patent: Feb. 7, 2017

(54) DISPLAY PANEL AND COMPOSITE DISPLAY PANEL USING THE SAME

(71) Applicant: Harvatek Corporation, Hsinchu (TW)

(72) Inventors: Ping-Lung Wang, Hsinchu (TW); Song-Yi Hsiao, Hsinchu (TW)

(73) Assignee: Harvatek Corporation, Hsinchu (TW)

( * ) Notice: Subject to any disclaimer, the term of this patent is extended or adjusted under 35 U.S.C. 154(b) by 0 days.

(21) Appl. No.: 14/960,454

(22) Filed: Dec. 7, 2015

(65) Prior Publication Data

US 2016/0370623 A1 Dec. 22, 2016

(30) Foreign Application Priority Data

Jun. 22, 2015 (TW) ............................. 104120011 A

(51) Int. Cl.
*G02F 1/1333* (2006.01)
*G02F 1/133* (2006.01)
*H05B 33/12* (2006.01)

(52) U.S. Cl.
CPC ....... *G02F 1/13336* (2013.01); *G02F 1/13306* (2013.01); *H05B 33/12* (2013.01)

(58) Field of Classification Search
CPC ... G02F 1/13336; G02F 1/13306; H05B 33/12
See application file for complete search history.

(56) References Cited

U.S. PATENT DOCUMENTS

| 9,007,755 | B2 | 4/2015 | Kim et al. | |
|---|---|---|---|---|
| 2006/0185499 | A1* | 8/2006 | D'Addario | G10G 7/02 84/454 |
| 2015/0153995 | A1 | 6/2015 | Curtis et al. | |

FOREIGN PATENT DOCUMENTS

| CN | 101685217 A | 3/2010 |
|---|---|---|
| CN | 103871330 A | 6/2014 |
| CN | 102576503 B | 4/2015 |
| CN | 104570513 A | 4/2015 |
| JP | 2014063033 A | 4/2014 |
| TW | M337752 U | 8/2008 |
| TW | M351723 U | 3/2009 |
| TW | M416813 U | 11/2011 |
| TW | 201337394 A | 9/2013 |
| TW | 201418834 A | 5/2014 |

* cited by examiner

*Primary Examiner* — David V Bruce
(74) *Attorney, Agent, or Firm* — CKC & Partners Co., Ltd.

(57) ABSTRACT

A display panel includes a substrate and a plurality of light emitting elements. The substrate has an inner edge and an outer edge opposite to each other. The inner edge is enclosed to form an enclosed opening. The light emitting elements are disposed on the substrate and enclose the enclosed opening to form an inner loop at the inner edge of the substrate and an outer loop at the outer edge of the substrate. The inner loop and the outer loop have similar shapes. A composite display panel is also disclosed.

20 Claims, 5 Drawing Sheets

DISPLAY PANEL AND COMPOSITE
DISPLAY PANEL USING THE SAME

RELATED APPLICATIONS

This application claims priority to Taiwanese Application Serial Number 104120011, filed Jun. 22, 2015, which is herein incorporated by reference.

BACKGROUND

Field of Invention

The present invention relates to a display panel.

Description of Related Art

With the maturity of the electronic device industry, display panels have been widely used in a variety of products to provide different display images. In recent years, large-sized display panels have become overwhelmingly popular. However, with consistently increasing size of the display panels, the manufacturing process is more complicated. The panel components are more difficult to manufacture, and the cost is also increased. For the forgoing reasons, there is a need to increase the size of the display panels with a limited cost.

SUMMARY

The present invention is to provide a display panel including a substrate and a plurality of light emitting elements. The substrate has an inner edge and an outer edge opposite to each other. The inner edge is enclosed to form an enclosed opening. The light emitting elements are disposed on the substrate and enclose the enclosed opening to form an inner loop at the inner edge of the substrate and an outer loop at the outer edge of the substrate. The inner loop and the outer loop have similar shapes.

In one or more embodiments, both the outer loop and the inner loop are rectangles, and aspect ratios of the outer loop and the inner loop are substantially the same.

In one or more embodiments, the outer edge and the inner edge are both rectangles. A diagonal of the outer edge has a first length. A diagonal of the inner edge has a second length. The first length is about 1.1 to about 2 times the second length.

In one or more embodiments, the substrate is assembled by a plurality of substrate components.

The present invention is to further provide a composite display panel including a first display panel and a second display panel. The first display panel is the aforementioned display panel. The second display panel is detachably assembled to the first display panel. A part of the second display panel is exposed from the enclosed opening.

In one or more embodiments, the first display panel and the second display panel partially overlap.

In one or more embodiments, the second display panel has a display area and an edge area. The edge area encloses the display area. The first display panel overlaps the edge area, and the display area is exposed via the enclosed opening of the first display panel.

In one or more embodiments, the first display panel extends to an outside of the edge area of the second display panel.

In one or more embodiments, the first display panel and the second display panel form an overlapping area, and a portion of the first display panel not overlapping the second display panel has a non-overlapping area. The non-overlapping area is larger than the overlapping area.

In one or more embodiments, the composite display panel further includes a picture control module electrically connected to the first display panel and the second display panel. The picture control module divides an output picture into an outer picture and an inner picture. Picture contents of the outer picture enclose picture contents of the inner picture. The picture control module transmits the outer picture to the first display panel and transmits the inner picture to the second display panel.

Not only can the above-mentioned display panel display pictures, but the enclosed opening can also accommodate another display device to increase the applications of the display panel.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and components are schematically depicted in order to simplify the drawings.

Figure 1:
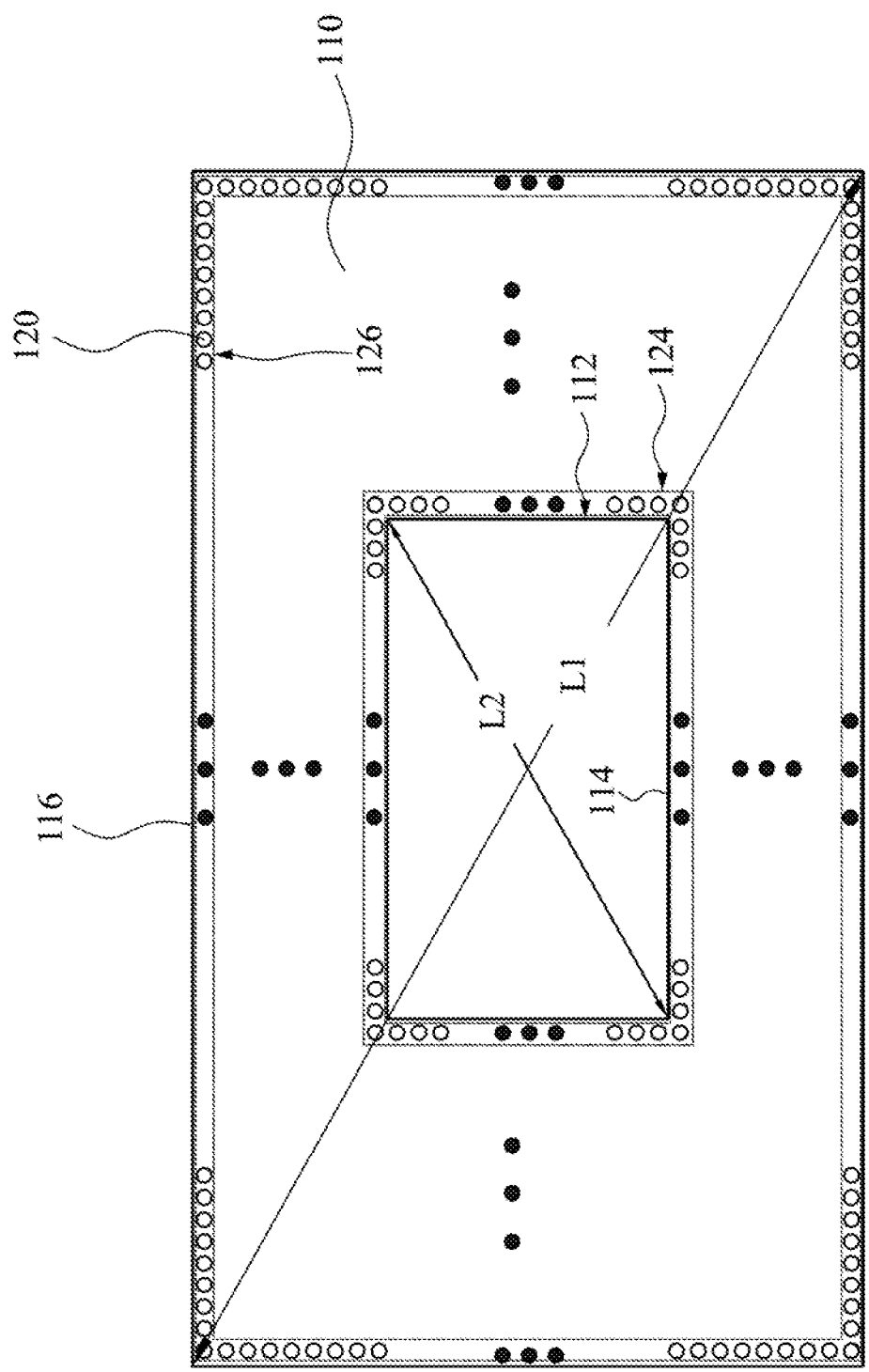
FIG. 1 is a schematic diagram of a display panel according to one embodiment of this invention.

FIG. 1 is a schematic diagram of a display panel 100 according to one embodiment of this invention. The display panel 100 includes a substrate 110 and a plurality of light emitting elements 120. The substrate 110 has an inner edge 114 and an outer edge 116 opposite to each other. The inner edge 114 is enclosed to form an enclosed opening 112. The light emitting elements 120 are disposed on the substrate 110 and enclose the enclosed opening 112 to form an inner loop 124 at the inner edge 114 of the substrate 110 and an outer loop 126 at the outer edge 116 of the substrate 110. The inner loop 124 and the outer loop 126 have similar shapes. To simplify matters, only part of the light emitting elements 120 in the inner loop 124 and the outer loop 126 are depicted in FIG. 1, and the other part of the light emitting elements 120 are omitted. In addition, a dimensional relationship between the light emitting elements 120 and the substrate 110 in FIG. 1 is illustrated only for example, and is not intended to limit the present invention. The light emitting element 120 may include a light emitting diode (LED), an organic light emitting diode, etc. The LEDs are easily assembled. The surface mount technology (SMT) can be utilized to combine the LEDs to a required size. Utilizing red LEDs, green LEDs, and blue LEDs would obtain a high light mixing saturation and a wide color range, and color performance tends not to be affected by environmental factors by way of self-luminousness.

The term "similar shapes" refers to that the inner loop 124 of the light emitting elements 120 and the outer loop 126 of the light emitting elements 120 are in a same polygonal shape. A number of pixels made of the light emitting elements 120 of one side of the inner loop 124 to a number of pixels made of the light emitting elements 120 of one side of the outer loop 126 corresponding to the one side of the inner loop 124 has a same ratio. For example, if the inner loop 124 and the outer loop 126 are both rectangles, a long side of the inner loop 124 corresponds to a long side of the outer loop 126. In FIG. 1, both the inner loop 124 and the outer loop 126 are rectangles. The long side of the inner loop 124 may have a plurality of light emitting elements 120, in which the number of the light emitting elements 120 is a multiple of sixteen. If each of the light emitting elements 120 is a pixel, then the number of pixels on the long side would be a multiple of sixteen. A short side of the inner loop 124 may have a plurality of light emitting elements 120, in which the number of the light emitting elements 120 is a multiple of nine. If each of the light emitting elements 120 is a pixel, then the number of pixels on the short side would be a multiple of nine. In addition, the long side of the outer loop 126 may have a plurality of light emitting elements 120, in which the number of the light emitting elements 120 is a multiple of thirty two. If each of the light emitting elements 120 is a pixel, then the number of pixels on the long side would be a multiple of thirty two. A short side of the outer loop 126 may have a plurality of light emitting elements 120, in which the number of the light emitting elements 120 is a multiple of eighteen. If each of the light emitting elements 120 is a pixel, then the short side would be a multiple of eighteen. Hence, the ratio of a pixel number of the one side of the inner loop 124 to a pixel number of the one side of the outer loop 126 corresponding to the one side of the inner loop 124 is the same (16:32 and 9:18), and aspect ratios of the display panel in the inner loop 124 and the outer loop 126 (that is aspect ratios of pictures displayed in the inner loop 124 and the outer loop 126) are substantially the same, that is, both are 16:9.

The above description only serves as an example and is not intended to limit the present invention. In other embodiments, the inner loop 124 and the outer loop 126 may either be a triangle or other polygons. Multiple light emitting elements 120 may constitute one pixel (for example: one red light emitting element, one green light emitting element, and one blue light emitting element constitute one pixel). The aspect ratios of the inner loop 124 and the outer loop 126 may also be a different ratio, such as 4:3. Numbers of the light emitting elements 120 in the inner loop 124 and the outer loop 126 may be determined based on resolution requirement. Additionally, the light emitting elements 120 may be arranged on the substrate 110 in a matrix or in other suitable manners, and the present invention is not limited in this regard.

Not only can the display panel 100 according to the present embodiment display pictures, but the enclosed opening 112 can also accommodate another display device to increase the applications of the display panel 100. More specifically, the display panel 100 can display images by utilizing the light emitting elements 120. At the same time, another display device or picture can be placed in the enclosed opening 112 so as to achieve the display function in cooperation with the display panel 100. In some embodiments, the enclosed opening 112 is not necessarily located at a center of the substrate 110. The enclosed opening 112 may also deviate from the center of the substrate 110. Basically, an embodiment falls within the scope of the present invention once the substrate 110 has the enclosed opening 112 and a distribution of the light emitting elements 120 satisfies the above-mentioned criteria.

In FIG. 1, the outer edge 116 and the inner edge 114 of the substrate 110 are both rectangles. A diagonal of the outer edge 116 has a first length L1. A diagonal of the inner edge 114 has a second length L2. The first length L1 is about 1.1 to about 2 times the second length L2. In some embodiments, the first length L1 may be one hundred inches, and the second length L2 may be eighty inches. Therefore, the first length L1 is about 1.25 times the second length L2. However, the present invention is not limited in this regard. Such a disposition allows the display panel 100 to have sufficient display space.

Figure 2:
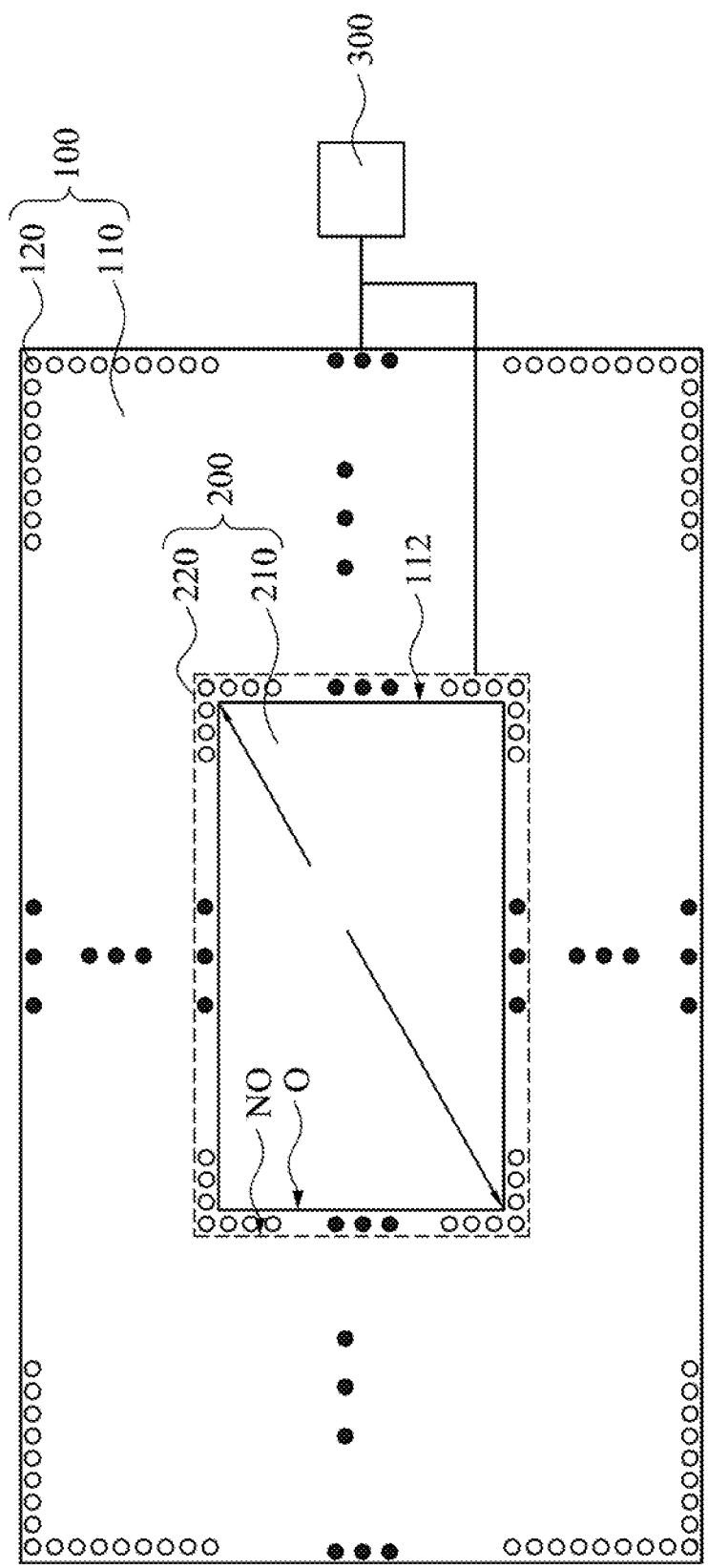
FIG. 2 is a schematic diagram of a composite display panel according to one embodiment of this invention.

In some embodiments, the display panel 100 can be combined with a liquid crystal display panel so as to increase the applications of the display panel 100. A description is provided with reference to FIG. 2. FIG. 2 is a schematic diagram of a composite display panel according to one embodiment of this invention. In greater detail, a composite display panel includes a first display panel and a second display panel. The first display panel may be the above display panel 100, and the second display panel may be a liquid crystal display panel 200. The liquid crystal display panel 200 is detachably assembled to the display panel 100. One part of the liquid crystal display panel 200 is exposed from the enclosed opening 112. For example, in FIG. 2, part of the liquid crystal display panel 200 is disposed at a back of the display panel 100.

In greater detail, with the progress of technology, the demand for large-sized display panels has consistently increased. However, for most of the display panels (such as the liquid crystal display panel 200), the manufacturing process for large-sized panels is more complicated and the panel components are more difficult to manufacture. Hence, the cost for the liquid crystal display panel 200 in a larger size is dramatically increased. The price thus remains high, which in turn possibly reduces users' purchase intentions. However, in the present embodiment, the liquid crystal display panel 200 is assembled to the display panel 100 and one part of the liquid crystal display panel 200 is exposed from the enclosed opening 112, that is, the display panel 100 encloses the liquid crystal display panel 200. Since the cost for the display panel 100 is not as high as that of the liquid crystal display panel 200, not only can the composite display panel according to the present embodiment output large-sized pictures, but its cost is also much lower than that for the conventional liquid crystal display panel in a larger size.

Figure 3:
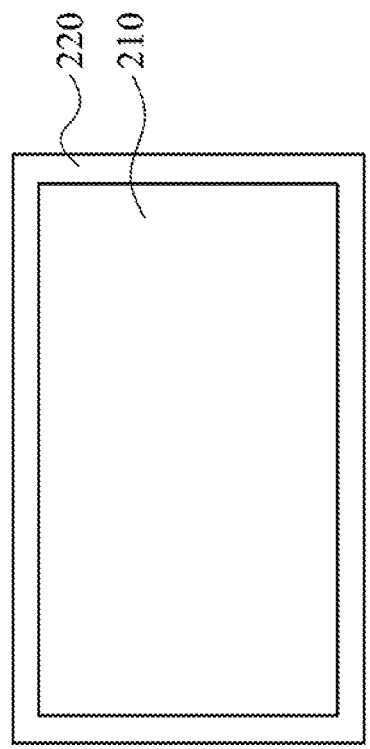
FIG. 3 is a schematic diagram of the liquid crystal display panel in FIG. 2.

In the present embodiment, the liquid crystal display panel 200 partially overlaps the display panel 100. A description is provided with reference to FIG. 2 and FIG. 3. FIG. 3 is a schematic diagram of the liquid crystal display panel 200 in FIG. 2. The liquid crystal display panel 200 has a display area 210 and an edge area 220. The edge area 220 encloses the display area 210. The display area 210 is the area in which the liquid crystal display panel 200 displays pictures, and the edge area 220 is the area in which peripheral circuits are disposed. Since the edge area 220 usually does not have the display function, the edge area 220 can also be called a non-display area in same embodiments. In FIG. 2, the display panel 100 overlaps the edge area 220 and the display area 210 is exposed from the enclosed opening 112 of the display panel 100.

As described above, because in some embodiments the edge area 220 does not have the display function, the display panel 100 can thus be utilized to hide the edge area 220. Hence, there is no gap between the display area 210 of the liquid crystal display panel 200 and a display picture of the display panel 100 to realize a large-sized display picture. However, in some other embodiments, the display panel 100 may further hide part of the display area 210 of the liquid crystal display panel 200 as required by practical needs, and the present invention is not limited in this regard.

In addition, the display panel 100 can extend to an outside of the edge area 220 of the liquid crystal display panel 200. The extent to which the display panel 100 extends may be determined depending on a size of the composite display panel required by users. For example, if a dimension of the liquid crystal display panel 200 is eighty inches, then the first length L1 (as indicated in FIG. 1) of the outer edge 116 of the display panel 100 may be one hundred inches. The composite display panel is thus able to display a 100-inch display picture.

With additional reference to FIG. 2, in other words; a portion of the display panel 100 overlapping the liquid crystal display panel 200 forms an overlapping area O, and a portion of the display panel 100 not overlapping the liquid crystal display panel 200 has a non-overlapping area NO. The non-overlapping area NO is larger than the overlapping area O. The overlapping area O is mainly used for hiding the edge area 220 of the liquid crystal display panel 200, and the non-overlapping area NO is mainly used for enlarging the display picture of the composite display panel.

Figure 4:
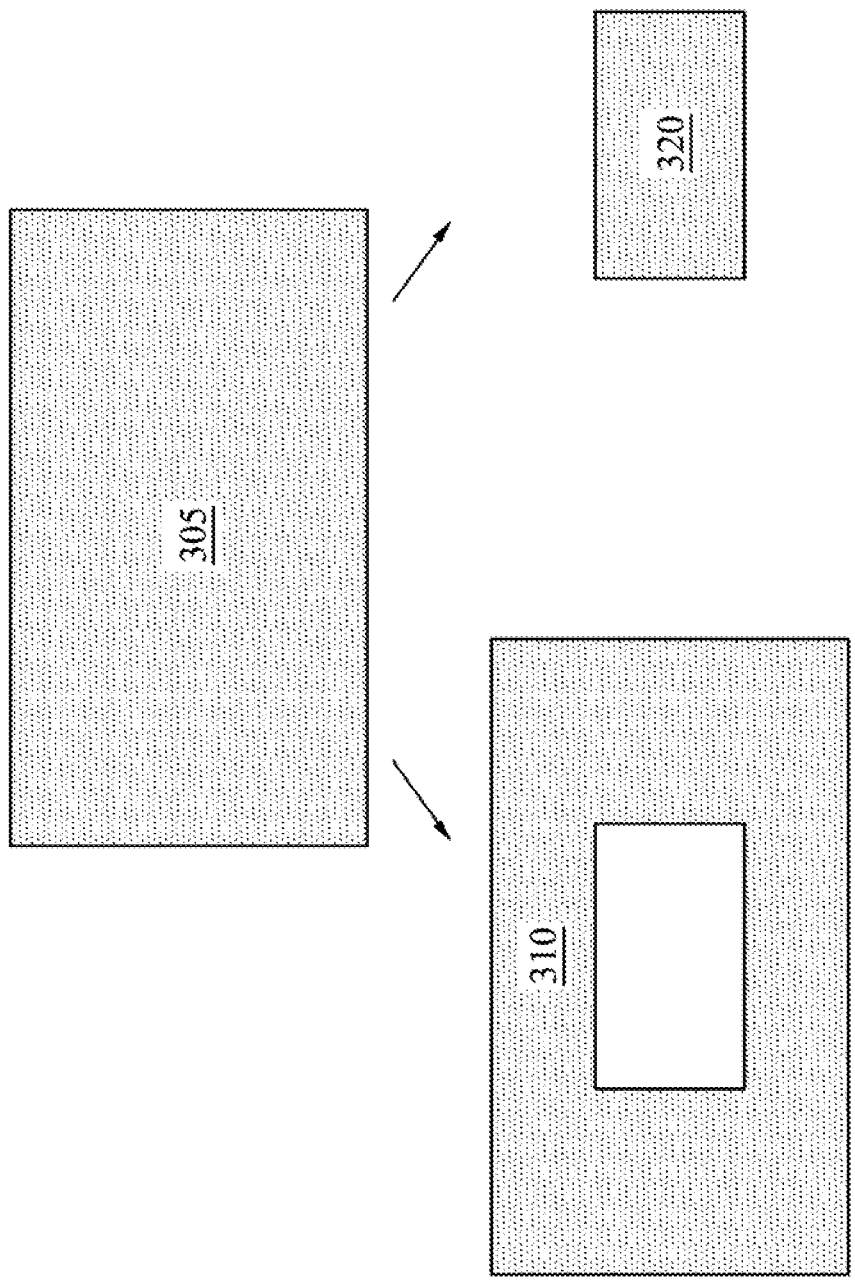
FIG. 4 is a schematic diagram of an output picture, an outer picture, and an inner picture according to one embodiment of this invention.

In consideration of the display picture, a description is provided with reference to FIG. 2 and FIG. 4. FIG. 4 is a schematic diagram of an output picture 305, an outer picture 310, and an inner picture 320 according to one embodiment of this invention. The composite display panel further includes a picture control module 300 electrically connected to the display panel 100 and the liquid crystal display panel 200. The picture control module 300 divides the output picture 305 into an inner picture 320 and outer picture 310. Picture contents of the outer picture 310 enclose picture contents of the inner picture 320. The picture control module 300 transmits the outer picture 310 to the display panel 100 and transmits the inner picture 320 to the liquid crystal display panel 200. Hence, the composite display panel is able to present the complete output picture 305 by utilizing the display panel 100 to display the outer picture 310 and utilizing the liquid crystal display panel 200 to display the inner picture 320. In some other embodiments, the picture control module 300 can divide the output picture 305 into the suitable outer picture 310 and inner picture 320 which are corresponding to each other, based on relative positions of the display panel 100 and the liquid crystal display panel 200 and a proportion of the display area 210. Additionally, in the present embodiment, the inner picture 320 and the outer picture 310 have the same picture aspect ratio, for example, both are 16:9.

Figure 5:
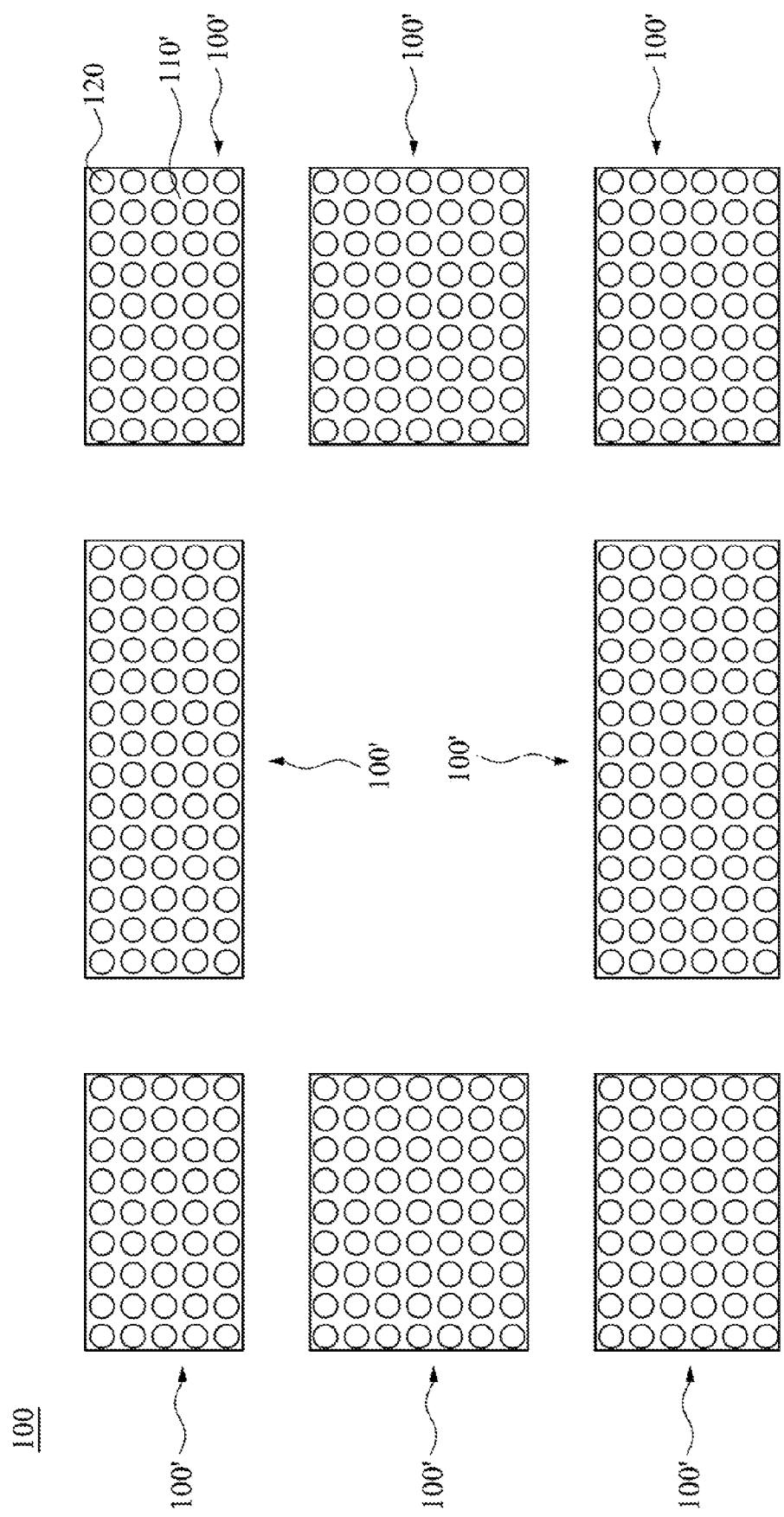
FIG. 5 is a schematic diagram of a display panel before being assembled according to another embodiment of this invention.

FIG. 5 is a schematic diagram of the display panel 100 before being assembled according to another embodiment of this invention. A difference between the present embodiment and the embodiment shown in FIG. 1 pertains to a structure of the substrate 110 (see FIG. 1). According to the present embodiment, the substrate 110 is assembled by a plurality of substrate components 110'. That is, the display panel 100 can be detached to a plurality of display components 100'. Each of the substrate components 110' can be engaged with one another by utilizing an engaging member (not shown in the figure) so as to assemble the substrate 110. Alternatively, the substrate 110 may be assembled by utilizing another method, and the present invention is not limited in this regard. As for the light emitting elements 120 on each of the display components 100', they can be connected to each other through wires. Such a structure will not only be advantageous to the transportation of the display panel 100, but also allow the display panel 100 in a suitable size to be assembled depending on users' requirements. In addition, it is advantageous to mass production so as to reduce the manufacturing cost. Since other details of the present embodiment are the same as those in FIG. 1, a description in this regard is not provided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel comprising:
   a substrate having an inner edge and an outer edge opposite to each other, the inner edge being enclosed to form an enclosed opening; and
   a plurality of light emitting elements disposed on the substrate and enclosing the enclosed opening to form an inner loop at the inner edge of the substrate and an outer loop at the outer edge of the substrate, wherein the inner loop and the outer loop have similar shapes.

2. The display panel of claim 1, wherein both the outer loop and the inner loop are rectangles, and aspect ratios of the outer loop and the inner loop are substantially the same.

3. The display panel of claim 1, wherein the outer edge and the inner edge are both rectangles, a diagonal of the outer edge has a first length, a diagonal of the inner edge has a second length, and the first length is about 1.1 to about 2 times the second length.

4. The display panel of claim 1, wherein the substrate is assembled by a plurality of substrate components.

5. A composite display panel comprising:
   a first display panel comprising:
      a substrate having an inner edge and an outer edge opposite to each other, and the inner edge being enclosed to form an enclosed opening; and
      a plurality of light emitting elements disposed on the substrate and enclosing the enclosed opening to form an inner loop at the inner edge of the substrate and an outer loop at the outer edge of the substrate, wherein the inner loop and the outer loop have similar shapes; and
   a second display panel detachably assembled to the first display panel, and a part of the second display panel being exposed from the enclosed opening.

6. The composite display panel of claim 5, wherein the first display panel and the second display panel partially overlap.

7. The composite display panel of claim 5, wherein the second display panel has a display area and an edge area, the edge area encloses the display area, the first display panel overlaps the edge area, and the display area is exposed via the enclosed opening of the first display panel.

8. The composite display panel of claim 7, wherein the first display panel extends to an outside of the edge area of the second display panel.

9. The composite display panel of claim 5, wherein the first display panel and the second display panel form an overlapping area, and a portion of the first display panel not overlapping the second display panel has a non-overlapping area, and the non-overlapping area is larger than the overlapping area.

10. The composite display panel of claim 5, further comprising:
a picture control module electrically connected to the first display panel and the second display panel, the picture control module dividing an output picture into an outer picture and an inner picture, picture contents of the outer picture enclosing picture contents of the inner picture, the picture control module transmitting the outer picture to the first display panel and transmitting the inner picture to the second display panel.

11. The composite display panel of claim 5, wherein both the outer loop and the inner loop of the light emitting elements of the first display panel are rectangles.

12. The composite display panel of claim 11, wherein aspect ratios of the outer loop and the inner loop of the light emitting elements of the first display panel are substantially the same.

13. The composite display panel of claim 12, wherein the aspect ratios are 16:9 or 4:3.

14. The composite display panel of claim 5, wherein the outer edge and the inner edge of the substrate of the first display panel are both rectangles.

15. The composite display panel of claim 14, wherein a diagonal of the outer edge of the substrate of the first display panel has a first length, a diagonal of the inner edge of the substrate of the first display panel has a second length, and the first length is about 1.1 to about 2 times the second length.

16. The composite display panel of claim 15, wherein the first length of the outer edge of the substrate of the first display panel is 100 inches, and the second length of the outer edge of the substrate of the first display panel is 80 inches.

17. The composite display panel of claim 5, wherein the substrate of the first display panel is assembled by a plurality of substrate components.

18. The composite display panel of claim 5, wherein the first display panel and the second display panel are different types display panels.

19. The composite display panel of claim 5, wherein the light emitting elements of the first display panel are light emitting diodes or organic light emitting diodes.

20. The composite display panel of claim 5, wherein the second display panel is a liquid crystal display panel.

* * * * *